US005828422A

United States Patent [19]

Gaudreau

[11] Patent Number: 5,828,422

[45] Date of Patent: Oct. 27, 1998

[54] GHOST CANCELER

[75] Inventor: Jean Etienne Gaudreau, Montreal, Canada

[73] Assignee: WavePhore, Inc., Phoenix, Ariz.

[21] Appl. No.: 631,346

[22] Filed: Apr. 12, 1996

[51] Int. Cl.[6] .......... H04N 5/21

[52] U.S. Cl. .......... 348/614; 348/607

[58] Field of Search .......... 348/614, 607, 348/611, 476, 477, 478; 358/167, 166, 905; H04N 5/21, 5/213

[56] References Cited

U.S. PATENT DOCUMENTS

| | | | |
|---|---|---|---|
| 4,115,811 | 9/1978 | Goff | 348/622 |
| 5,299,004 | 3/1994 | Joo et al. | 348/614 |
| 5,321,512 | 6/1994 | Huang | 348/614 |
| 5,654,765 | 8/1997 | Kim | 348/614 |

*Primary Examiner*—Chris Grant
*Attorney, Agent, or Firm*—Snell & Wilmer, L.L.P.

[57] ABSTRACT

Embodiments of methods and apparatuses for removing ghosts from a signal such as a communications signal received over a channel where the output symbol pattern is used for selecting correction factors for correcting the received symbols. The correction factor is added to the sampled symbols and the sampled symbol is compared with a selected one of a plurality of thresholds based upon the closeness of the various thresholds to a sequence of the corrected symbol values. That comparison forms the basis for the next output symbol in the output sequence. Further, the selected correction factor is updated by taking the difference between the selected correction factor and an error measurement between the corrected sample value and the nominal value of the symbol times a damping factor. At various points in the sequence, the output is forced to an expected symbol sequence such as a clocking sequence used for clock recovery.

21 Claims, 1 Drawing Sheet

GHOST CANCELER

BACKGROUND OF THE INVENTION

1. Area of the Art

This invention relates to ghost canceling and multipath compensation and more particularly relates to echo canceling in teletext systems.

2. Description of the Prior Art

It has long been known that television and other communication signals suffer various types of degradation due to transmission arising from interference from noise and from multipath. For example, in television signals, if a transmitted television signal is reflected off of a building or large geographic feature such as a mountain, antennas in the television service area may receive enough of a signal from this reflecting object to cause discernable interference. Typically, at television frequencies this interference may be discernable by the viewer of a television set coupled to such an antenna as a ghost image on the screen. In addition, in cable television systems, such ghosts may result from improper termination causing reflections due to impedance mismatching.

A variety of techniques have been advanced historically to compensate for ghosting. These include adaptive baseband equalizers and other related techniques.

However, a problem with such equalizers is that they often require complicated and expensive extra circuitry and are not generally suitable for implementation with a microprocessor that is also being used to perform other functions. While a microprocessor such as a Pentium or Pentium Pro microprocessor available from Intel of Santa Clara, Calif. may be able to implement adaptive baseband equalization (ABBE) algorithms, such microprocessors often have many other tasks to perform, particularly if the microprocessor is also processing a video signal for a variety of purposes and running other software through a multi-tasking operating system such as OS/2, Windows or Windows 95. ABBE typically involves multiplication which requires many bit samples.

Similarly, if one makes a hardware version of an equalizer, such hardware versions typically require expensive and slow circuitry or require digital signal processors. Such components are undesirable for products designed for the consumer market.

Therefore, it is a first object of this invention to provide a method and apparatus for ghost canceling of a video signal. It is a second object of this invention to provide such a ghost canceling system that may be implemented on a microprocessor with minimum complexity to permit the microprocessor to perform many other functions. It is yet another object of the invention to provide such echo canceling for teletext.

SUMMARY OF THE INVENTION

These and other objects of the invention are provided by a method of correcting for ghosts using a look up table and damping factors. The sequential baseband samples of the video signal should be preferably teletext data having one of two nominal values and each symbol is altered by a correction factor. The appropriate correction factor is selected based upon a part of the output sequence. The sequential samples are corrected and then sliced to be either a one or a zero. The corrected samples are also examined to determine if the correction factor needs to be altered and the correction factor is altered and stored in a lookup table based upon the output sequence of the slicer.

DETAILED DESCRIPTION OF THE INVENTION

Figure 1:
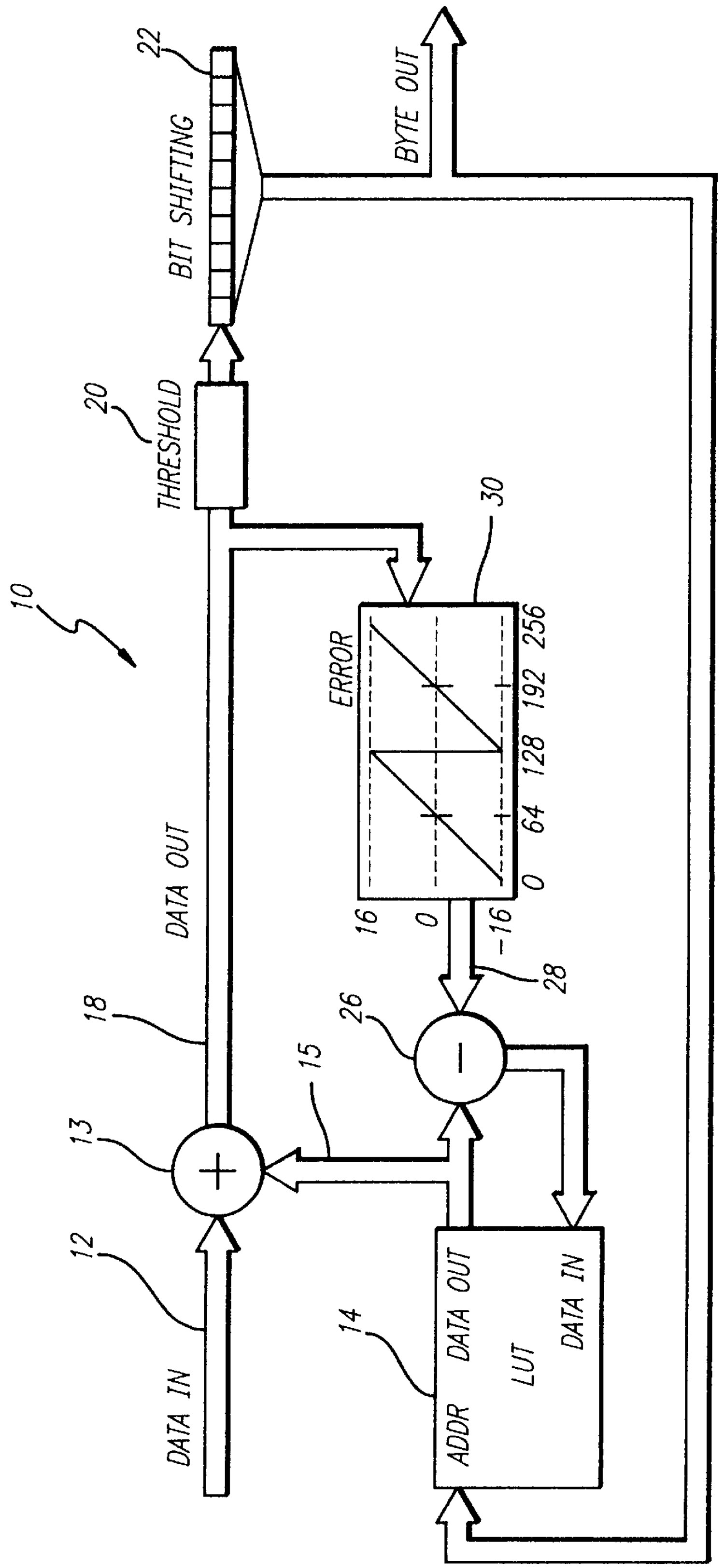
FIG. 1 is a block diagram of the process of an embodiment of the invention.

FIG. 1 is a block diagram of an embodiment 10 of the process. The input analog signal (not shown) is baseband video information that preferably includes teletext according to North American Broadcast Teletext System (NABTS) Standards. In NABTS, the data symbols are limited to "zeros" and "ones" and the data is transmitted on lines ten through twenty-one inclusive of each field, which form part of the vertical blanking interval. A zero cosine pulse is one-quarter of the peak white video level and a one cosine pulse is three-quarters of the peak white level. The data rate is 5.7Mbits per second with no data being transmitted for the first thirteen microseconds of each sixty-three microsecond long line. The first two bytes of each line are for recovery of the clock and are the sync pattern of 101010 . . . 10 (eight times). Following the sync pattern is the frame header of E7 and thirty-three bytes of data before the horizontal blanking interval at the end of the line.

In the preferred embodiment, the analog baseband signal is provided to an automatic gain controlled amplifier (AGC) so that an eight bit analog to digital converter nominally converts a nominal teletext "zero" at one-quarter peak white value to a digital value of sixty-four and converts a nominal teletext "one" at three quarters peak white value to a value of "one hundred ninety-two." However, although the specific embodiment described is for teletext, the invention could be used with other types of symbols such as those available from QPSK, QAM and FSK. Also, the processes may be used in paging systems like POCSAG and FLEX and digital wireless communications schemes such as CDPD, PCS, and TDMA.

In the embodiment of FIG. 1, the teletext symbols on each of lines 10 through 21 of the vertical blanking interval are sampled to provide a digital data sequence with the sync pattern at the start of each line removed. Thus, the first symbol of each line to be processed in the embodiment of FIG. 1 is the frame start of "E7." At the start of each line, a sequence representative of the sync sequence of "1010101010" is set as the output sequence for the converter function 22. Of course, for signals other than NABTS teletext, other sync sequences and framing formats may be used. Still further, the disclosed embodiments may also be used with signals that lack sync codes and framing signals.

The converted data samples are preferably provided from a buffer for ghost cancellation to the system implementing the ghost method 10 shown in FIG. 1 as the Data In 12. The eight bit wide Data 12 In is provided to an eight bit adding function 13 that provides an eight bit wide sum 18 based upon an output 15 of the look-up table (LUT) function 14 and the Data In 12. The sum 18 is provided to a threshold converter or slicer function 20 that provides an output bit of a digital "one" for any byte greater than the halfway point (here one hundred twenty-eight) and a "zero" otherwise. Where only two symbols are used, the threshold has been selected to be midway between the zero and one symbols, i.e., at one hundred twenty eight. The output of the threshold function 20 is a ten bit serial to parallel converter function 22. The serial to parallel converter shift function may comprise a FIFO serial to parallel shift register such as cascaded 74164's available from many semiconductor manufacturers. The serial to parallel converter function 22 provides ten bit words as an output for further processing and also provides that ten bit word as the address input of the lookup table function 14. The ten bits in the converter function 22 consist of the ten most recently processed symbols or bits with the left most (most significant) bit being the most recent.

For each sequential sample, the lookup table function 14 provides the ghosting correction factor addend output 15 as input data for the summer function 13. The appropriate ghosting correction factor is selected based upon the ten bits in the serial to parallel converter function. In particular, this means that the most recently processed, recovered symbols provide the basis for selecting the correction factor from the look-up table function.

The output 15 of the lookup table function 14 is also provided to a difference function 26 for calculating an updated or modified correction factor for replacing the current output of the lookup table function 14. The other input of the difference function 26 is provided by an error function 30. The error function 30 takes the difference between the corrected sample 18 from the adder function 13 and the nearest nominal value for a symbol. That error measurement is then multiplied by a damping factor, which is one-fourth here so that a "shift right operation" of two bits may be used in a microprocessor with the result being rounded off. The damped error measurement is subtracted from the correction factor to obtain an updated correction factor to replace the prior correction factor.

The error function as is preferably a triangle wave function a shown in FIG. 1 with the peaks being at the threshold and maximum value. The damped error value is provided at the output 28 and the correction factor may be stored in a memory having a look-up table.

In the example of the NABTS, the error is determined by comparing the corrected value output 18 of the adder with the nominal value for a one or a zero. If the corrected value is greater than the midpoint between a digital zero and one (one hundred and twenty eight in this example), the nominal one value (one hundred and ninety two in this example) is subtracted from the corrected value and multiplied by the damping factor (four in this example) to obtain the error measurement. If the value is less than that midpoint (one hundred and twenty eight in this example), the nominal zero value (sixty four in this example) is subtracted from the corrected value 18, and multiplied by the damping factor to obtain the damped error value to be supplied to the subtractor function. The difference between the correcting factor and the damped error value is then stored in the lookup memory to provide an update the correction factor for the next symbol where the output sequence is the same as the current output sequence.

Initialization requires loading on powering up of the system to load the look-up table function 14 with all zeros. Further at the start of each line of wide samples, the values of the shift register is forced to be a ten byte long sequence of ones followed by a zero, which represents the clock synchronization pattern at the start of each line of teletext. Upon receipt of the frame code E7 for a line of video samples, the ghost canceler process is initiated.

Table I provides a pseudo code listing of the functions described above for implementation with a microprocessor such as an Intel Pentium where eight bit sampled data for each horizontal line in the vertical blanking interval holding teletext after the clocking sequence is stored in a buffer as a linear array called "value". The index for the array is called "value_position" and the position of the start of teletext frame in the array is called the "framecode position" and is separately identified by processes based upon detecting the alternating sequence of "1010 . . . " ten times followed by E7 in the samples. The output of the process is a ten bit register called "output" and the base address for the look up table for the correction factor is "LUT". Further, the microprocessor performs comparisons and sets a compare flag bit to be high when the variable for the comparison is greater than the predetermined value.

```
value_position=framecode position          /*go to position in buffer that is the start of the
                                           frame code in the teletext line*/
Initialize Output=1010101010               /*Set Output register to clock sync code/*
halfway_point=128                          /*Select threshold equal to halfway point at 128
Do

    read value at value_position           /*get next eight bit sample*/
    read correction at                     /*get correction from look-up table*/
        LUT+Output
    value=value+correction                 /*correct sample with correction*/
    compare value with halfway_point       /*is corrected sample a "1" or "0"
    if comparision_flag is low             /*if a "0", compute error by subtracting the nominal
        error=value−64                     value
    else                                   /*if a "1" compute error by subtracting the nominal
        error=value−192                    value*/
    shift error right two bits             /*divide by four to dampen*/
    correction=correction+error            /*recalculate correction based upon current error
                                           and replace old correction in look up table*/
    write correction at                    /*update output word*/
        LUT+Output
    shift Output right and make MSB
    of output=
        Compare flag
    value_position=+1                      /*repeat for next sample of line*/
While value_position<272
```

By using the foregoing code, a microprocessor is able to perform the functions required and described with respect to FIG. 1. Alternatively, as is obvious to those of ordinary skill in the field, it would also be possible to build an electronic circuit according to the functionality of FIG. 1 by using glue logic, RAMs, buffers, FIFOs, shift registers, and discrete adders and subtractors.

In addition, while the specific embodiment disclosed is for a teletext signal where there are merely two symbols values, other schemes may be used such as with each symbol having three or more possible values. In that event, for three possible symbol values, two thresholds (located at one-third and two-thirds maximum value) are used, (for example eighty-five and one hundred seventy for eight bit data) and the nominal values are located at one-sixth, three-sixths, and five-sixths (for example, forty four, one hundred twenty eight and two hundred twenty). Further, instead of having an error function with one comparison and two triangles, the error function will have two comparisons and three triangles. Further, rather than determining the output with one comparison, two comparisons will be needed.

Further, the symbols may also be the land Q symbols for QPSK or QAM in which event each of the I and the Q values must be processed separately. For example, with a total of four symbols in QAM, with two possible I and two possible Q values, each of the I and Q symbols may be processed in the manner discussed above with the corrected cluster points being subsequently determined from the corrected I and Q values. Higher resolutions of QAM may be processed using the means described above for symbols with multiple values.

Also, although no ABBE needs to be used, the process of FIG. 1 may be modified to further include a thirteen bit output register function (not shown) instead of a ten bit output register with the most significant bits being used for ABBE before providing the output. Thus, the symbols go through two corrections: (i) frequency and phase correction from the ABBE, and (ii) multipath distortion and attenuation at higher frequency.

Therefore, the disclosed embodiments provide a mechanism for removing ghosts and other forms of multipath noise using a recursive filtering technique that provides updated correction factors based upon the sequence of the output. This permits implementation of the filter using minimal instructions and avoiding using true multiplication. As can be seen, many hardware and software embodiments are possible. Of course, the scope of the invention should be measured by the claims.

I claim:

1. A method of eliminating noise from an input stream of digital samples of a signal received from a communications medium, each of the samples nominally having one of two values to produce an output data stream, the method comprising:

- selecting a correction value from a plurality of correction values based upon the output data stream;
- adding the correction value to each sample sequentially to provide a corrected data sample;
- determining if the corrected sample is closer to a first or a second nominal value;
- determining a difference between the corrected sample and the closer of the nominal values;
- multiplying the difference by a damping factor to be the correction value; and
- updating the correction value based upon the multiplication.

2. The method of claim 1, wherein the input stream nominally has a predetermined pattern occurring from time to time, the method further including presetting the output data stream to the predetermined pattern.

3. The method of claim 2, wherein the presetting occurs whenever the method is about to be performed on a portion of the data stream immediately following the predetermined pattern.

4. The method of claim 2, wherein the method is performed upon a portion of the data stream comprising the predetermined pattern, the damping factor being selected to obtain a nominal reconstruction of the predetermined pattern.

5. An apparatus for removing ghosts from an incoming data stream of samples of a signal to produce an output data stream with the ghosts substantially attenuated, the apparatus comprising:

- an alterable addressable memory having an input and an output and a plurality of storage locations, at least some of the plurality of storage locations storing a correction factor, the selection of the correction factor provided at the output depending upon at least a part of the output data stream;
- an adder responsive to each sample and the correction factor output by the memory to provide a corrected sample;
- a comparator responsive to the corrected sample and a predetermined threshold to produce an output data value for the output data stream based upon the comparison; and
- a correction factor update circuit selecting a value to be updated based upon at least a part of the output stream;
- wherein each sample nominally has one of two values, the correction factor circuit responding to the difference between the corrected sample and one of the two nominal values to replace the selected correction factor.

6. The apparatus of claim 5, wherein the difference between the corrected sample and one of the two nominal values is multiplied by a damping factor to obtain a value with which to modify the selected correction factor.

7. The apparatus of claim 5, wherein the adder is used by the correction circuit to obtain the difference.

8. The apparatus of claim 6, wherein the threshold is halfway between the nominal values.

9. An apparatus for removing ghosts from a series of samples received over a noisy communication channel of a portion of a video signal having a series of signal levels having nominal values, the apparatus providing at an output data stream, the apparatus comprising:

- a correction value memory storing a plurality of correction values;
- a processor adapted to be responsive to a program memory coupled to the processor and capable of performing at least the functions of addition, subtraction, comparisons between two values that result in a binary signal indicating whether a first value is greater than a second value, and serially shifting a results of any of the other functions;
- the program memory coupled to the processor for causing the processor to perform the following operations:
  - reading a correction value from the correction value memory based upon a portion of the output data stream;
  - adding the read out correction value to a sample to produce a corrected sample;
  - comparing the corrected sample with a threshold value to produce output data and including the output data in the output data stream;
  - determining the difference between the corrected sample from the nominal value which is closest numerically to the corrected sample to obtain an improved measurement of the error in a current sample; and
  - replacing the read out correction value with a replacement correction value based upon the improved measurement.

10. The apparatus of claim 9, wherein the program further includes the step of:

multiplying the improved measurement by a damping factor to obtain a value with which to modify selected correction value for replacement.

11. The apparatus of claim 10, wherein in initialization the contents of the correction value memory are initialized to zero.

12. A process for reducing effects of multipath and other types of noise in a communications medium on a digital binary signal encoded in some of the lines of a vertical blanking interval of a transmitted video signal, the signal including various sequences of bits encoded into the vertical blanking interval, the received binary encoded signal being sampled, the process comprising:

correcting sequential samples with a correction factor selected based upon a series of recent output values;

outputting a binary sequence for the sequential samples based upon a comparison of each sample with a threshold value; and generating correction factors based upon the differences between the corrected sequential samples and expected nominal values for each of those samples to be used for correcting subsequent sequential samples.

13. The process of claim 12, wherein the process generating correction factors further comprises generating a difference between prior binary sequence outputs and the differences between the corrected sequential samples and the expected nominal values.

14. A method of generating correction values for compensating for multipath and other noise in a communications channel, a signal transmitted in the channel including coded symbols having nominal signal levels that are subject to being altered by noise in communications channel and received symbols being sampled, the method comprising:

generating initial, predefined correction factors and storing the predefined correction factors in a memory having addresses;

reading a correction factor from a specific address in the memory based upon a sequence of sampled symbols;

comparing data based upon a sampled symbol with an expected nominal level of the symbol to produce an error signal; and comparing the error signal with the read out correction factor to provide a replacement correction factor at the same address as the read out correction factor.

15. The method of claim 14, wherein the step of comparing the error signal with the read out correction factor further includes reducing the error signal by a damping factor before comparing the reduced error signal with the read out factor.

16. The method of claim 15, wherein the generation of a correction factor is repeated from time to time based upon the sequence of the sampled symbols.

17. The method of claim 16, wherein a correction factor is added to at least some of the sampled symbols to provide altered sample symbols for selecting the address of the correction factor to be read from the memory.

18. The method of claim 17, wherein from time to time the selection of the correction factor is determined based upon a predefined sequence of symbols.

19. The method of claim 18 wherein the predefined sequence of symbols is "1010101010."

20. The method of claim 18, wherein the predefined sequence of symbols further includes "E7".

21. A method for processing a received symbol sequence from samples of symbols to produce an output symbol sequence that have been altered by transmission over a communications channel, the method comprising:

processing samples of each symbol sequentially by altering the symbol with a correction factor;

comparing the output symbol with a threshold to generate the next output symbol in the sequence;

adaptive baseband equalizing a sequence of the most recently processed symbols;

selecting a group of symbols that have already been adaptively baseband equalized to select a correction factor with a current symbol;

altering the selected correction factor by comparing the selected correction factor with an error between a nominal symbol value and the selected correction factor.

* * * * *